United States Patent [19]
Perloff et al.

[11] Patent Number: 5,128,935
[45] Date of Patent: Jul. 7, 1992

[54] BYTE-WIDE REPEAT FILTER

[75] Inventors: Ronald S. Perloff, Poway; Timothy L. Garverick, Cupertino, both of Calif.

[73] Assignee: National Semiconductor Corporation, Santa Clara, Calif.

[21] Appl. No.: 433,360

[22] Filed: Nov. 8, 1989

[51] Int. Cl.$^5$ .................................................. H04J 3/06
[52] U.S. Cl. ................................. 370/85.4; 370/85.5; 370/85.12; 340/825.50
[58] Field of Search ............... 370/85.4, 85.5, 85.12, 370/85.2; 340/825.50; 371/41

[56] References Cited

U.S. PATENT DOCUMENTS 4,835,776  5/1989  Annamalai ........................... 371/14
5,046,182  9/1991  Hamstra et al. ......................... 85/1

OTHER PUBLICATIONS

FDDI Physical Layer Protocol (PHY), Draft Proposed American National Standard, X3T9/85-39, Rev. 13, Aug. 22, 1986.
Floyd E. Ross, "FDDT-an overview", Digest of Papers, Computer Soc. Intl. Conf. Compcon '87', pp. 434-444.
The Supernet Family for FDDI, Datebook, Advance Micro device, pp, 5-1 thru 5-37.
Supernet for FDDI Articles, Advance Micro device.

*Primary Examiner*—Douglas W. Olms
*Assistant Examiner*—Temesghen Ghebretinsae
*Attorney, Agent, or Firm*—Limbach & Limbach

[57] ABSTRACT

In an FDDI token ring network, a repeat filter that treats FDDI Set and Reset symbols occurring in a frame prior to an End Delimiter symbol as a violation and does not repeat these symbols onto the FDDI ring. In addition to the three states described in the FDDI repeat filter standard for a byte-wide implementation, a repeat filter in accordance with the present invention includes a fourth END state. The presence of this END state allows the REPEAT state to be restricted such that it treats bytes within a frame with either symbol of the byte being either a Set or Reset symbol as a violation and a Halt byte is transmitted onto the ring; the repeat filter then enters the Halt state. In addition, the repeat filter is also responsive to "mixed" bytes that consist of an FDDI data symbol and an FDDI control symbol. If the mixed byte is a data symbol followed by an End Delimiter symbol, then the repeat filter transmits an FDDI zero symbol followed by an End Delimiter symbol and enters the END state; if the mixed byte consists of a data symbol followed by an Idle symbol, then the repeat filter transmits an Idle byte and enters the Idle state.

8 Claims, 3 Drawing Sheets

BYTE-WIDE REPEAT FILTER

BACKGROUND OF THE INVENTION

1. Field of the Invention

The present invention relates to data transmission networks and, in particular, to a repeat filter function within stations on a network which prevents certain illegal data character sequences from being repeated onto the network transmission medium.

2. Discussion of the Prior Art

Asynchronous communication between stations in a data transmission network occurs through the transmission of a series, or "frame", of information characters, with adjacent frames being separated by explicit or implicit start-stop patterns. The use of a unique start pattern ("start delimiter") and a unique stop pattern ("end delimiter") allows the receiving station to identify the exact beginning and the exact end of each received frame.

A particular type of data transmission network is defined by the Fiber Distributed Data Interface (FDDI) protocol The FDDI protocol is an American National Standards Institute (ANSI) data transmission standard which applies to a 100 Mbit/sec. token ring network that utilizes an optical fiber transmission medium. The FDDI protocol is intended as a high performance interconnection between a number of computers as well as between the computers and their associated mass storage subsystems and other peripheral equipment.

Information is transmitted on an FDDI ring in frames that consist of a sequence of 5-bit characters or "symbols", each symbol representing 4 data bits. Information is typically transmitted in symbol pairs or "bytes". Tokens are used to signify the right to transmit data between stations.

Of the thirty-two member FDDI standard symbol set, sixteen are data symbols (each representing 4 bits of ordinary data) and eight are control symbols. The eight control symbols are J (the first symbol of a start delimiter byte JK), K (the second symbol of a start delimiter byte JK), I (Idle), H (Halt), Q (Quiet), T (End Delimiter), S (Set) and R (Reset).

A continuous stream of control symbol patterns defines a line state. The FDDI protocol defines four line states:

(1) Idle Line State (ILS), which is a continuous stream of Idle symbols;

(2) Quiet Line State (QLS), which is a continuous stream of Quiet symbols;

(3) Halt Line State (HLS), which is a continuous stream of Halt symbols; and (4) Master Line State (MLS), which is an alternating stream of Halt and Quiet symbols.

The remaining eight symbols of the FDDI standard symbol set are not used since they violate code run length and DC balance requirements of the protocol. These are referred to as V (violation) symbols.

Table I below sets forth the FDDI standard symbol set.

TABLE I

| FDDI STANDARD SYMBOL SET | |
|---|---|
| SYMBOL | CODE |
| 0 | 11110 |
| 1 | 01001 |
| 2 | 10100 |
| 3 | 10101 |
| 4 | 01010 |
| 5 | 01011 |
| 6 | 01110 |
| 7 | 01111 |
| 8 | 10010 |
| 9 | 10011 |
| A | 10110 |
| B | 10111 |
| C | 11010 |
| D | 11011 |
| E | 11100 |
| F | 11101 |
| J | 11000 |
| K | 10001 |
| I | 11111 |
| H | 00100 |
| Q | 00000 |
| T | 01101 |
| S | 11001 |
| R | 00111 |

FIG. 1 shows the fields which are used within the FDDI frame and token formats. A preamble field (PA), which consists of a sequence of Idle symbols, precedes every transmission. The Idle symbols provide a maximum frequency signal which is used for receive clock synchronization. The Start Delimiter field (SD) consists of a two symbol start delimiter pair which is uniquely recognizable independent of symbol boundaries. As stated above, the Start Delimiter byte establishes the boundaries for the information that follows. The Frame Control field (FC) defines the type of frame and its characteristics; it distinguishes synchronous from asynchronous transmission, specifies the length of the address and identifies the type of frame. The Frame Control field uniquely distinguishes a token. The Ending Delimiter field (ED) of a token consists of two end delimiter symbols and completes a token. The Destination Address (DA) and Source Address (SA) fields contain the destination and source addresses of the transmitted frame. The Destination Address field and the Source Address field are both either two bytes long or six bytes long, as determined by the Frame Control field. The Destination Address may be either an individual address or a group address. The Frame Check Sequence field (FCS), which is four bytes long, contains a cyclic redundancy check using the ANSI standard polynomial. The INFORMATION field, as is the case for all fields covered by the Frame Check Sequence check, consists only of data symbols. The End Delimiter of a frame is one end delimiter symbol (T), which is followed by the Frame Status field (FS) which consists of three control indicator symbols which indicate whether the addressed station has recognized its address, whether the frame has been copied, or whether any station has detected an error in the frame. The "T" followed by three control indicators represents the minimum end delimiter required by the FDDI protocol for a non-token frame. The protocol allows for additional pairs of control symbols in the End Delimiter or an additional odd number of control symbols followed by one last "T" symbol. All conforming implementations must be able to process these extended end delimiters without truncating them. The end delimiter "T" and the two control symbols "R" and "S" are uniquely encoded and distinguishable from either normal data or Idle symbols.

FIG. 2 shows the component entities necessary for a station to be in compliance with the FDDI protocol. The identified components include a Station Management function (SMT) which is a part of network management that resides in each station on the network to control the overall action of the station to ensure proper operation as a member of the ring. A Physical function (PHY) provides the hardware connection to adjacent stations. A Media Access Control function (MAC) controls access to the transmission medium, transmitting frames to and receiving frames from the Media Access Control functions of other stations.

The Physical function provides the optical fiber hardware components that allow a link from one FDDI station to another (It should be noted that a Physical Media Dependent portion of the FDDI protocol specifies the opto-mechanical hardware to be used for connection to adjacent nodes; the Physical function standard covers the area from optical characteristics through the symbol or byte wide interface with the Media Access Control function.). The physical function simultaneously receives and transmits. The Physical function's transmit logic accepts data from the Media Access Control function, converts this data to FDDI symbols and transmits the encoded serial data stream on the medium. The Physical function's receive logic receives the encoded serial data stream from the medium, establishes symbol boundaries based on the recognition of a start delimiter symbol pair and forwards decoded symbols to its associated Media Access Control function.

Additional information regarding the FDDI protocol is presented by Floyd E. Ross, "FDDI - an Overview", Digest of Papers, Computer Soc. Intl. Conf., Compcon '87, pp. 434-444, which is hereby incorporated by reference to provide additional background information relating to the present invention.

Certain FDDI station configurations require that the Physical function be able to repeat the symbol stream received on an inbound physical link directly as a symbol stream on an outbound physical link without an intervening Media Access Control function. In this situation, a repeat filter function is required somewhere after line state detection in the repeat path between the inbound physical link and the outbound physical link.

The repeat filter function prevents propagation of certain code violations and invalid line states from the inbound link to the outbound link, while permitting propagation of lost frames so that they can be correctly counted by the next Media Access Control function in the logical ring. Although the repeat filter function is not required when the station configuration includes a Media Access Control function in a logical ring, it may still be implemented in-line with the Media Access Control function without affecting correct ring operation.

FIG. 3 shows the basic FDDI protocol repeat filter function expressed as a state diagram. In FIG. 3, states are shown as vertical staffs and state transitions as horizontal arrows, with the triggering event or condition shown above the arrow and any action shown beneath the arrow.

According to the FDDI protocol, the repeat filter must change the symbol stream according to the following rules:

1. Following an Idle symbol, all subsequent symbols are changed into Idle symbols until another Idle symbol or a J symbol is encountered;

2. If the symbol immediately after a J symbol is not a K symbol, then an implementation whose elasticity buffer and decode functions can create duplicate J symbols shall interpret the J symbol (not followed by a K symbol) as a V symbol (i.e., change the J symbol to an Idle or Halt symbol, depending on the current stare). Other implementations are permitted to repeat the J symbol, or to interpret the J symbol or the next (non-K) symbol as a V symbol;

3. Following a JK symbol sequence, if another K symbol or a Quiet, Halt or V symbol is encountered, that symbol is changed into a Halt symbol. The next three symbols are also changed into Halt symbols unless a J or Idle symbol is encountered. After the fourth output Halt symbol, all subsequent symbols are changed into Idle symbols, until a J symbol is encountered. (This rule facilitates the correct counting of corrupted frames by the next Media Access Control function in the logical ring.

For a byte-wide (i.e. symbol pair) implementation of the Physical function, the FDDI protocol permits the following variations:

1. State RF1:SD is not required, since both the J and K symbols of the starting delimiter are aligned for transmission in the same byte. Thus, transitions may be made directly to state RF2:Repeat from the other states upon receipt of a JK symbol pair.

2. Transitions to RF0:Idle are made from the other states when an Idle symbol is detected as the first symbol of a symbol pair; from state RF3:Halt after sourcing four Halt symbols (two Halt symbol pairs); and optionally after an Idle symbol is processed as the second symbol of a symbol pair.

3. Otherwise, while in state RF2:Repeat, if either symbol in the symbol pair is a J or K (with the exception of the JK starting delimiter pair), or a Q, H, or V, a transition to state RF3:Halt occurs instead of repeating the symbol pair.

Thus, a byte-wide repeat filter implementation results in a three-state filter, the RF1:SD state shown in the FIG. 3 symbol-wide implementation being unnecessary.

A disadvantage of the above-described protocol, both in the case of the four-state symbol-wide implementation and the three-state byte-wide implementation, is that it allows certain illegal symbols to be repeated onto the ring. Specifically, it allows the uniquely coded symbols S (Set) and R (Reset) within a frame prior to an end delimiter symbol T to be repeated.

SUMMARY OF THE INVENTION

The present invention provides a repeat filter for FDDI applications that treats FDDI Set and Reset symbols occurring in a frame prior to an end delimiter as a violation and does not repeat these symbols onto the ring. In addition to the three states described in the FDDI repeat filter standard for a byte wide implementation, a repeat filter state machine in accordance with the present invention includes a fourth END state. The END state allows bytes within a frame with either symbol of the byte being either a Set or a Reset symbol to be treated as a violation and a Halt byte (HH) is transmitted onto the ring; the repeat filter then enters the Halt state, just as in the case of other violations.

In addition, a repeat filter in accordance with the present invention is responsive to "mixed" bytes within a frame that consist of a data symbol and a control symbol. If the "mixed" byte is a data symbol followed by an end delimiter symbol, then the repeat filter transmits a zero followed by an end delimiter symbol and enters the END state; if the "mixed" byte consists of a data symbol followed by an Idle symbol, then the repeat filter transmits an Idle symbol pair and enters the Idle state.

A better understanding of the features and advantages of the present invention may be obtained by reference to the following detailed description of the invention and accompanying drawings which set forth an illustrative embodiment in which the principles of the invention are utilized.

DETAILED DESCRIPTION OF THE INVENTION

Figure 1:
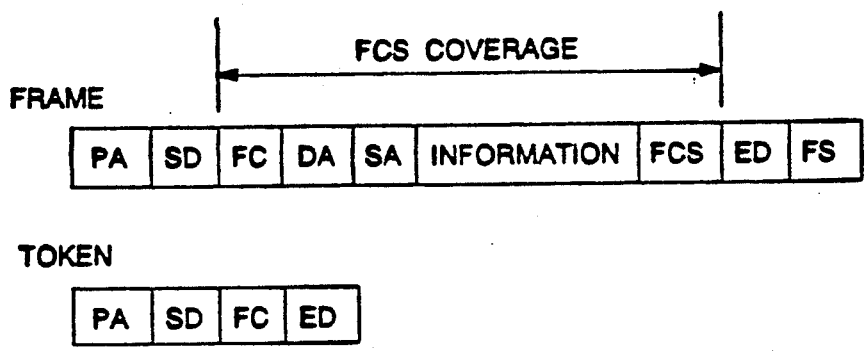
FIG. 1 is a diagram illustrating the fields used within the FDDI frame and token formats.
Figure 2:
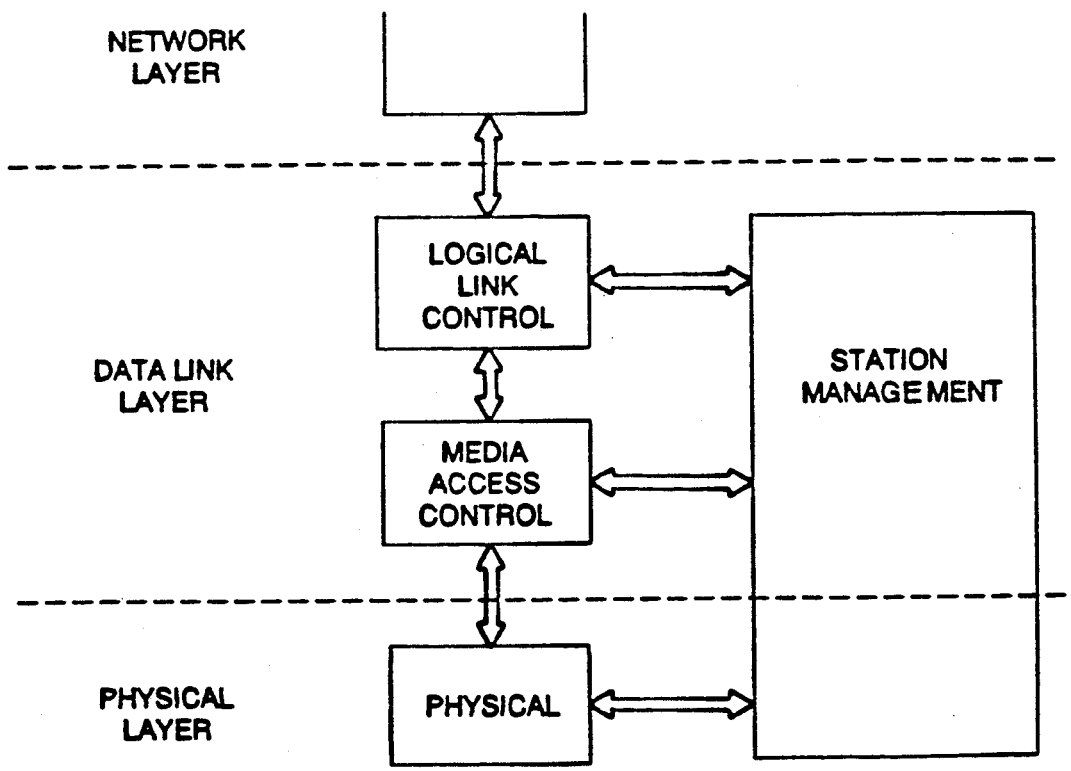
FIG. 2 is a block diagram illustrating the component entities necessary for a station to be in compliance with the FDDI protocol.
Figure 3:
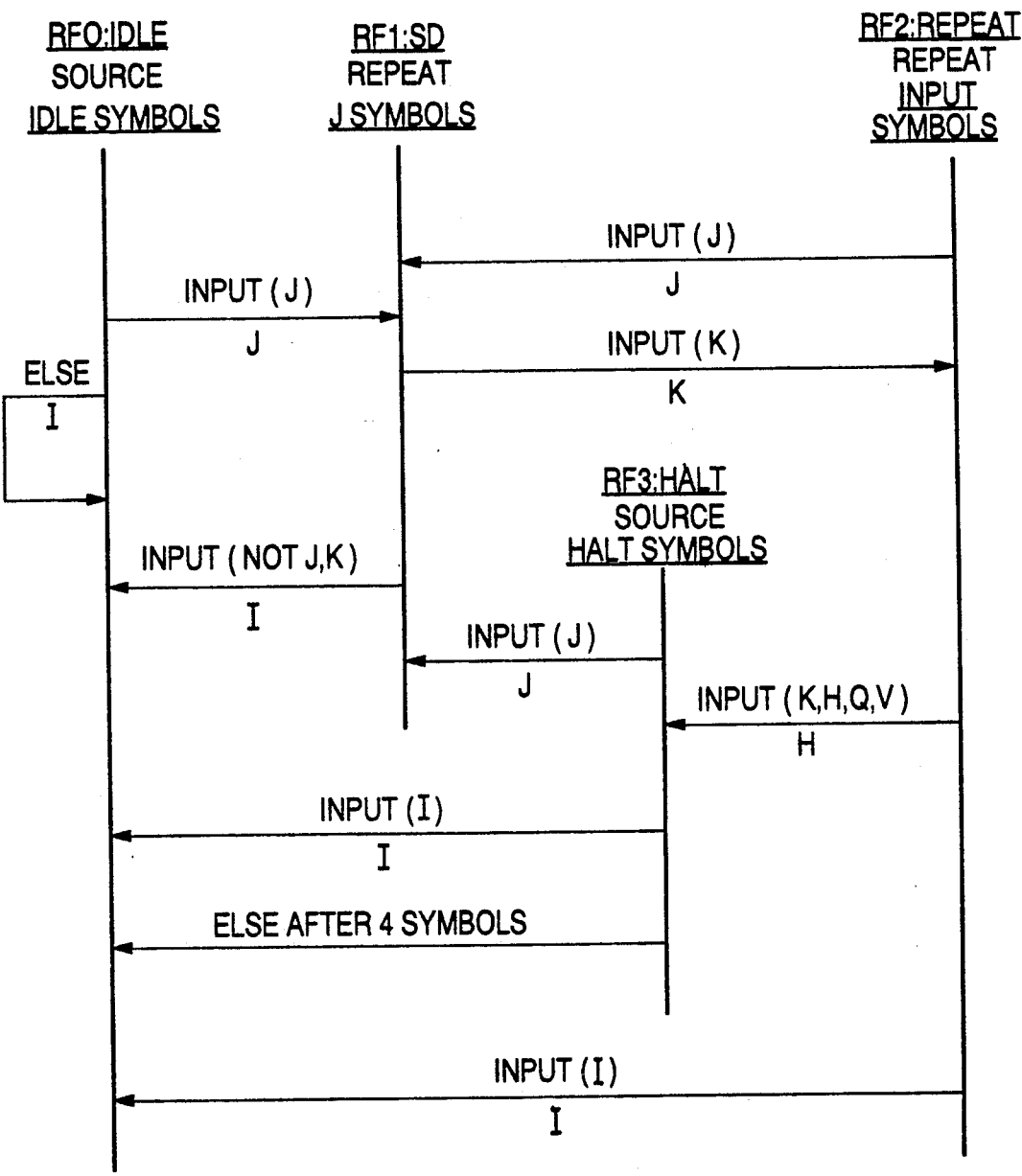
FIG. 3 is a state diagram illustrating a repeat filter function in compliance with the FDDI protocol.
Figure 4:
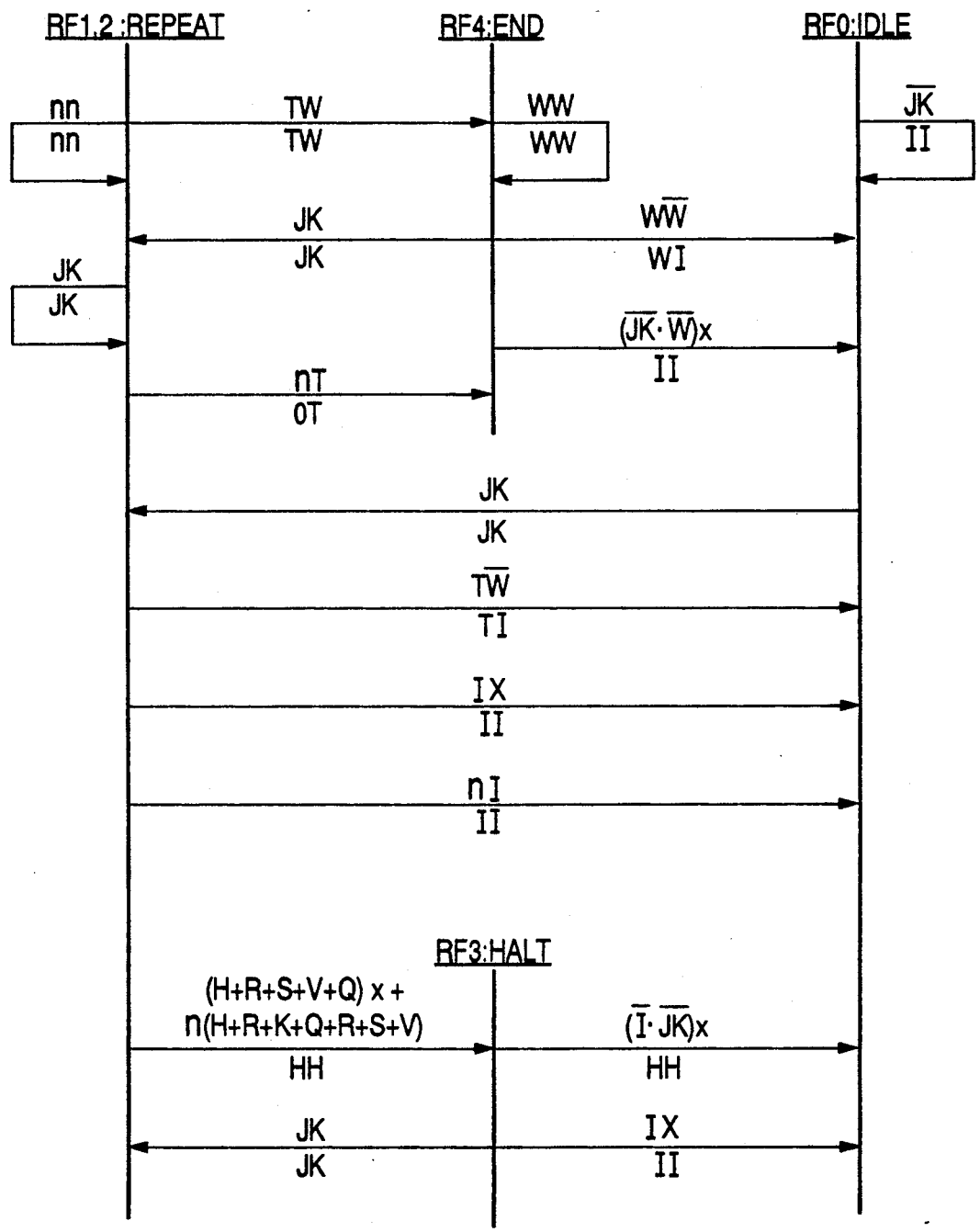
FIG. 4 is a state diagram illustrating an FDDI repeat filter function in accordance with the present invention.

FIG. 4 shows a repeat filter, expressed as a state diagram that implements the concepts of the present invention in the context of the Fiber Distributed Data Interface (FDDI) protocol. Those skilled in the art will recognize that a state machine for executing the state diagram shown in FIG. 4 may be readily implemented utilizing conventional logic.

In FIG. 4, repeat filter states are shown as vertical staffs and state transitions are shown as horizontal arrows, the triggering event or condition being shown above the arrow and any repeat filter action being shown beneath the arrow. "W" is defined as the set including a T (End Delimiter), R (Reset) and S (Set) FDDI symbols. "n" indicates a data symbol. "x" means "any symbol".

The illustrated repeat filter includes four states: RF0:Idle, RF1,2:Repeat, RF3:Halt, and RF4:End.

When in the RF0:Idle state, if a received byte is not a JK symbol pair, then the repeat filter sources Idle bytes. The only transition from the RF0:Idle state occurs if a received byte is a JK pair. Then the repeat filter sources JK and enters the RF1,2:Repeat state.

When in the RF1,2:Repeat state, if the received byte is a data byte nn or a JK pair, then the repeat filter repeats the input byte nn or JK, respectively. If the received byte consists of an End Delimiter symbol followed by a symbol that is nor W (i.e., is not T, R or S), the repeat filter sources an End Delimiter symbol T followed by an Idle symbol and then enters the RF0:Idle state. If the first symbol of a received byte is an Idle symbol regardless of the identity of the second symbol of the pair (i.e., the received byte is Ix), or if the received byte is a data symbol n followed by an Idle symbol, then the repeat filter sources an Idle byte (II) and enters the RF0:Idle state. If the received byte is an End Delimiter symbol T followed by an element of W, then the repeat filter sources TW and enters the RF4:End state. If the first symbol of the received byte is one of H, R, S, V, or Q, regardless of the identity of the second symbol of the pair, or if the first symbol is a data symbol n which is not followed by either an End Delimiter symbol T or and Idle symbol, then the repeat filter sources a Halt byte (HH) and enters the RF3:Halt state.

If the received byte is a data symbol n followed by an End Delimiter symbol T, then the repeat filter sources OT and enters the RF4:End state.

When in the RF3:Halt state, if the first symbol of the received byte is not an Idle symbol and the received byte is not a JK symbol pair, then the repeat filter sources Halt (HH) and enters the RF0:Idle state. If the received byte is a JK pair, then the repeat filter sources JK and enters the RF1,2:Repeat state. If the first symbol of the received byte is an Idle symbol, then the repeat filter sources an Idle byte (II) and enters the RF0:Idle state.

When in the RF4:End state, if both symbols of a received byte are W, then the repeat filter repeats the received byte and remains in the RF4:End state. If the received byte is JK, then the repeat filter sources JK and enters the RF1,2:Repeat state. If the first symbol is W and the second symbol is not W, then the repeat filter sources the first received symbol (i.e. W) followed by an Idle symbol and enters RF0:Idle state. If the received byte is not JK and the first symbol of the received byte is not W, then the repeat filter sources an Idle byte (II) and enters the RF0:Idle state.

It should be understood that various alternatives to the embodiments of the inventions described herein may be employed in practicing the invention. It is intended that the following claims define the scope of the invention and that the structure and methods within the scope of these claims and their equivalents be covered thereby.

What is claimed is:

1. In a data transmission network in accordance with the FDDI protocol wherein FDDI information frames comprising FDDI bytes are transferred between stations in the network via a fiber optic transmission medium, each station receiving FDDI bytes on an inbound link with the transmission medium and transmitting FDDI bytes on an outbound link with the transmission medium, a repeat filter connected between the inbound link and the outbound link for repeating FDDI Start Delimiter bytes JK and FDDI data bytes nn received on the inbound link directly to the outbound link, the repeat filter comprising:
    (a) means for preventing propogation of violation FDDI bytes in a received FDDI frame from the inbound link to the outbound link; and
    (b) means for preventing propogation of FDDI bytes that include said FDDI Set or Reset symbol from the inbound link to the outbound link when the FDDI byte that includes an FDDI Set or Reset symbol is received by the repeat filter in a frame prior to an FDDI byte that includes an FDDI End Delimiter symbol.

2. In a data transmission system in accordance with the FDDI protocol wherein FDDI information frames comprising FDDI bytes are transferred between stations in the network via a fiber optic transmission medium, each station receiving said FDDI bytes on an inbound link with the transmission medium and transmitting said FDDI bytes on an outbound link with the transmission medium, a method of repeating said FDDI bytes received on the inbound link directly to the outbound link, the method comprising:
    (a) identifying receipt of start delimiter and data FDDI bytes in a received FDDI frame;
    (b) identifying receipt of said FDDI byte that includes an FDDI Set or Reset symbol in the received FDDI frame prior to receipt of said FDDI byte that includes an FDDI End Delimiter symbol;
(c) repeating the identified start said delimiter and data FDDI bytes on the outbound link; and
(d) preventing repetition of the FDDI bytes that include said FDDI Set or Reset symbol and are received in a frame prior to receipt of said FDDI byte that includes said FDDI End Delimiter symbol on the outbound link.

3. In a data transmission network in accordance with the FDDI protocol wherein FDDI information frames comprising FDDI bytes are transferred between stations in the network via a fiber optic transmission medium, each station receiving said FDDI bytes on an inbound link with the transmission medium and transmitting said FDDI bytes on an outbound link with the transmission medium, the FDDI bytes comprising a combination of FDDI data symbols and/or FDDI control symbols, a repeat filter for repeating start deliniter and data FDDI bytes received on the inbound link to the outbound link, the repeat filter comprising:
(a) means for identifying a mixed FDDI byte consisting of an FDDI data symbol and an FDDI control symbol; and
(b) means responsive to identification of the mixed FDDI byte for transmitting a replacement FDDI byte on the outbound link.

4. A repeat filter as in claim 3 wherein the mixed byte consists of said FDDI data symbol followed by an FDDI End Delimiter symbol and the replacement FDDI byte consists of an FDDI zero symbol followed by an FDDI End Delimiter symbol.

5. A repeat filter as in claim 3 wherein the mixed byte consists of said FDDI data symbol followed by an FDDI Idle symbol and the replacement FDDI byte consists of an FDDI Idle symbol pair.

6. In a data transmission network in accordance with the FDDI protocol wherein FDDI information frames comprising FDDI bytes are transferred between stations in the network via a fiber optic transmission medium, each station receiving said FDDI bytes on an inbound link with the transmission medium and transmitting said FDDI bytes on an outbound link with the transmission medium, the FDDI bytes comprising a combination of FDDI data symbols and/or control symbols, a method of repeating FDDI start delimiter and data bytes received on the inbound link directly to the outbound link, the method comprising:
(a) identifying receipt of said FDDI start delimiter and data bytes;
(b) identifying receipt of a mixed FDDI byte consisting of an FDDI data symbol and an FDDI control symbol;
(c) repeating the identified said FDDI start delimiter and data bytes on the outbound link; and
(d) in response to identification of the mixed FDDI byte, transmitting a replacement FDDI byte on the outbound link.

7. A method as in claim 6 wherein the mixed byte consists of said FDDI data symbol followed by an FDDI End Delimiter symbol and the replacement FDDI byte consists of said FDDI zero symbol followed by an FDDI End Delimiter symbol.

8. A method as in claim 6 wherein the mixed byte consists of an FDDI data symbol followed by an FDDI Idle symbol and the replacement FDDI byte consists of said FDDI Idle symbol pair.

* * * * *